(12) United States Patent
Butaud

(10) Patent No.: US 6,585,018 B2
(45) Date of Patent: Jul. 1, 2003

(54) LINEAR GUIDE FOR SHAPING TOOLS

(76) Inventor: Percy W. Butaud, P.O. Box 3632, Parker, CO (US) 80134

( * ) Notice: Subject to any disclaimer, the term of this patent is extended or adjusted under 35 U.S.C. 154(b) by 0 days.

(21) Appl. No.: 09/939,346

(22) Filed: Aug. 24, 2001

(65) Prior Publication Data

US 2003/0037840 A1 Feb. 27, 2003

(51) Int. Cl.$^7$ .............................. B27M 1/00; B27C 9/00
(52) U.S. Cl. ..................... 144/371; 33/32.1; 83/485; 144/48.6; 144/134.1; 144/137; 409/178; 409/181; 409/321
(58) Field of Search ................... 33/32.1, 32.2, 33/32.3, 45; 83/435.25, 485, 487; 144/48.5, 48.6, 134.1, 136.95, 137, 371, 144.1; 409/178, 181, 182, 304, 317, 321

(56) References Cited

U.S. PATENT DOCUMENTS

| | | | |
|---|---|---|---|
| 1,695,457 A | * 12/1928 | Duncan | 33/32.1 |
| 3,635,268 A | * 1/1972 | Lange | 144/136.95 |
| 4,114,664 A | * 9/1978 | Cotton | 144/154.5 |
| 5,365,812 A | * 11/1994 | Harnden | 83/487 |
| 5,778,949 A | * 7/1998 | Draves | 144/136.95 |

* cited by examiner

*Primary Examiner*—W. Donald Bray

(57) ABSTRACT

First and second guide plates are engaged for linear sliding between them by a channel and rib engagement system. A grooving tool is carried by the plate associated with the rib, and the rib is in axial alignment with the tool head, such that the tool head can lead the rib. When a groove is being cut into a workpiece, the rib can follow the tool head into the cut groove to extend the range of the guide. Ribs of different size can be selected to coordinate with the tool and groove width. Filler strips similarly coordinate the channel width. An alternate or supplemental guide system joins the first plate to a series of accordion style hinged and foldable plates. These plates guide the first plate in linear movement as they fold or unfold.

15 Claims, 2 Drawing Sheets

LINEAR GUIDE FOR SHAPING TOOLS

BACKGROUND OF THE INVENTION

1. Field of the Invention

The invention generally relates to woodworking and to shaping machines, especially to grooving machines. More specifically, the invention relates to a process of woodworking involving mechanical cutting or shaping, especially to a process for cutting using a templet or pattern. The invention also relates to milling and to a templet tracer or cutter. In a specific application, the invention is a guide for use with a tool cutting a linear groove.

2. Description of Related Art Including Information Disclosed Under 37 CFR 1.97 and 1.98

One of the chief uses for a shaping tool such as a saw or router in woodworking is to cut a straight groove. Circular saws and routers often are distinguished as separate tools, but both are able to cut a straight groove. Each tool carries a tool head at a predetermined position, such as at the end of a motor shaft. The tool performs work by spinning the tool head, which has the general shape of a cylinder with a series of chisel edges on its circumferential surface.

The spinning cylindrical tool head is connected to a power driven motor, such as an electric motor, by a chuck or other connector for the appropriate tool head. Each tool head can be attached to an end of the motor shaft so that it spins at the same speed as the motor, or it can be driven by an intermediate drive mechanism to spin at a different speed. Both types of tool can be equipped with a support plate for establishing a spacing or supported position between the workpiece and the tool head while the tool head performs its work. In hand held tools, the support plate is between the motor housing and the tool head. In mounted tools such as a radial arm saw, table saw, or table mounted router, the support plate is an underlying table. The support plate of a circular saw is parallel to the motor axis, while the support plate of a router is perpendicular to the motor axis.

The tool head of a router often is a generally cylindrical bit, with a relatively long cylinder axis as compared to a circular saw blade. The router bit has a relatively short cylinder diameter as compared to a circular saw blade. A router bit commonly is about one-half or three-fourths inch in diameter, although the diameter may vary within a single bit to enable the router to produce an ornate pattern on a workpiece. However, a bit in the shape of a cylinder is useful to cut a groove equal to the diameter of the cylinder into a workpiece. A router can selectively axially extend the bit beyond the support plate of the router, along the axis of the cylindrical bit or motor shaft for variable engagement with the workpiece. The bit is extended over a preselected range of engagement with the workpiece to cut a groove of any desired depth with the preselected range.

The tool head of a circular saw is a generally cylindrical blade, with a cylinder axis of only about one-eighth inch. The diameter of the saw blade is many times greater than that of a typical router bit. Circular saw blades often have a diameter of several inches with popular diameters ranging from about seven to ten inches. The blade can be extended through the support plate of the saw within a preselected range along the radius of the cylindrical blade and perpendicular to the axis of the motor housing, rather than along the axis of the cylinder as done in a router. In this way, the saw blade cuts into a workpiece by a preselected radial depth. A saw often is used to cut through the entire thickness of a workpiece to sever it, but a circular saw blade can cut a groove of less depth than the full thickness of the workpiece by appropriate radial adjustment of the blade with respect to the support plate. The width of the groove can be made wider than the typical one-eighth inch thickness of a blade making repeated adjacent cuts or by using a wider blade or assembly of several blades.

The sameness between a router and a circular saw is significant because other similar shaping tools exist but are given special names. Regardless of the name used, shaping tools frequently share the general characteristic of spinning a cylinder with chisel teeth on its circumference. This type of tool is within the category of shaping tools, regardless of the specific name applied to it.

Linear grooves are given different names according to their shape and purpose. These include the mortise, which is usually a rectangular cavity in wood or other material that is prepared to receive a tenon. Another type of straight groove is a rabbet, which is a cut along or near the edge of a piece of wood that allows another piece to fit into it to form a joint. Still another variety of groove is a dado, which is a rectangular groove cut into a board so that a like piece may be fitted into it. Straight grooves are used due to the ease of measurement, fabrication, and assembly of mating straight edges.

Fabricating a straight groove can be difficult when the groove is significant in length. In a professional woodworking shop, large scale equipment is used to guide the necessary tooling and the workpiece with respect to each other. However, such equipment is costly, and its size can be prohibitively large.

Various types of guides are used to cut a straight groove in a workpiece. A straightedge can be clamped to a workpiece and the tool moved along it in a straight line. Alternatively, the tool can be mounted to a table with a straightedge or fence also attached to the table to guide the workpiece. A tool can carry an adjustable spacer arm with an edge guide on its end. These types of guides are useful but not always practical, especially when the groove is spaced by a considerable distance from the nearest parallel edge of the workpiece.

It would be desirable to have a linear guide for shaping tools that is small in size. Similarly, it would be desirable to have a linear guide for shaping tools that is simple in construction while it enables forming a straight cut of considerable length.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide an improved apparatus and method for cutting a straight groove in wood or other materials.

A more specific object is to enable a shaping tool such as a router or circular saw to form a cut in a straight line. Such a cut may be a shaped groove such as a mortise, dado, rabbet, or saw cut of almost any length.

Additional objects, advantages and novel features of the invention shall be set forth in part in the description that follows, and in part will become apparent to those skilled in the art upon examination of the following or may be learned by the practice of the invention.

According to the invention, a guide is suited to direct a power driven shaping tool adapted to carry a tool head in a predetermined position for movement along a linear axis of movement. The guide is formed of a first plate having first and second opposite faces that are positioned parallel to the linear axis of movement. The first plate defines a tool head aperture that passes through the first and second faces of the plate. A connecting device on the first plate is positioned to attach a shaping tool to the first side of the first plate in a position where a tool head carried by the shaping tool is aligned for passage through the tool head aperture. The first plate is guided for movement along the linear axis of movement One mechanism for guiding is a longitudinally elongated channel follower positioned parallel to the linear axis of movement, aligned with the tool head aperture, and extending from the second face of the first plate. Another mechanism for guiding is a plurality of juxtaposed guiding members joined in a linearly extendable series by pivots operating on parallel axes, interconnecting the guiding members. The guiding members are moveable along the axis of movement between a folded position and an extended position. A guiding member on a leading end of the linear series is pivotally joined to the first plate, and a guiding member located on a trailing end of the linear series carries an anchor for attachment to an external surface. The two guiding members can be used together.

According to a further aspect, the guide may include a second plate having first and second opposite faces positioned parallel to the linear axis of movement. The first face of the second plate faces the second face of the first plate. The second plate defines a longitudinally elongated channel in its first face, positioned parallel to the linear axis of movement, and sized to receive the channel follower.

The accompanying drawing, which is incorporated in and forms a part of the specification illustrates preferred embodiments of the present invention, and together with the description, serves to explain the principles of the invention. In the drawing:

DETAILED DESCRIPTION OF THE INVENTION

Figure 1:
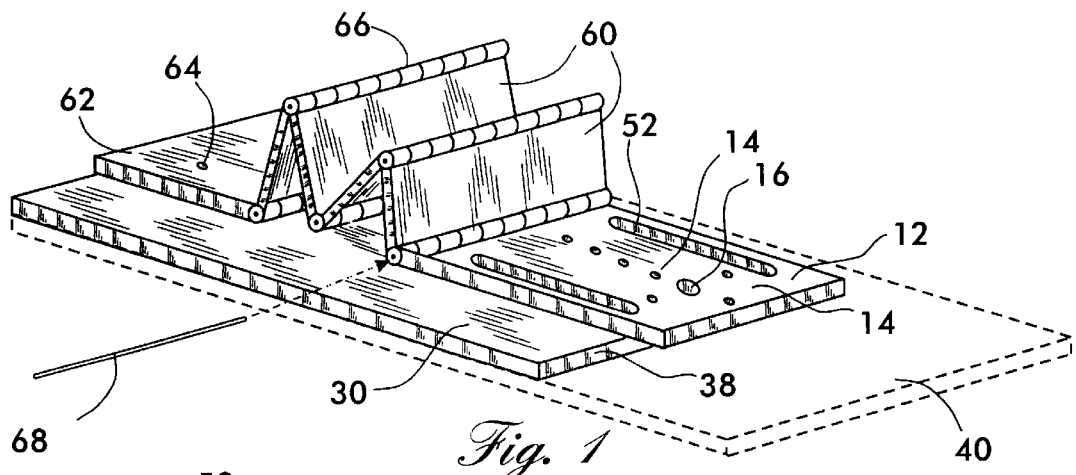
FIG. 1 is an isometric assembly view of a linear guide with optional expanding accordion links, showing a removable hinge pin and showing the guide resting on a support table indicated in phantom.
Figure 2:
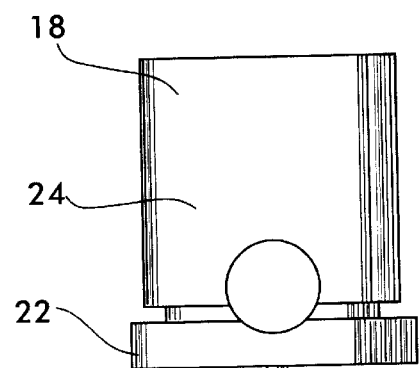
FIG. 2 is a side elevational view of the guide, showing a hold-down fastener and showing the attachment of a power driven shaping tool.
Figure 2:
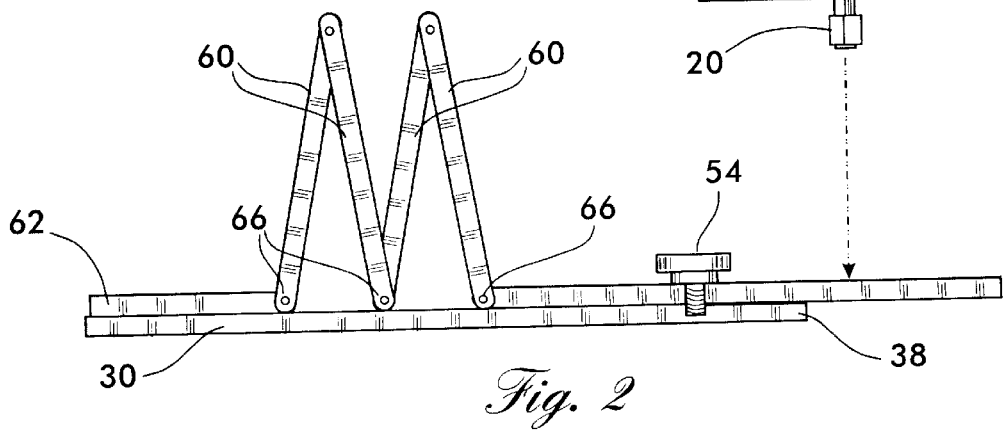

With particular reference to FIGS. 1 and 2, the invention provides a guide 10 for forming a linear groove in a workpiece by guiding a power driven shaping tool along a straight path. The invention is especially applicable to a tool of the hand held variety. The guide is formed of a planar first plate 12, which will be referred to as a slide plate. A suitable mounting or fastening means 14 permits a shaping tool to be attached to the slide plate, such as to a first side or top side of the slide plate. The guide directs the shaping tool along a linear path or single axis of movement, which permits the tool to cut a linear groove in a workpiece.

A shaping tool is adapted to carry a tool head at a predetermined position, such as along the central motor shaft of a router. The slide plate is shaped and configured to pass the tool head to an opposite side from the remainder of the shaping tool. For example, the slide plate defines a tool aperture 16 positioned with respect to the fastening means so that the aperture receives the tool head carried by the shaping tool when the shaping tool is mounted to the first plate at the predetermined mounting position. The aperture is sized and positioned to permit the tool head of the shaping tool to pass through it so that the tool head can perform work on a workpiece located on the second side or bottom side of the slide plate. In an alternate arrangement, the slide plate may define a mounting locating carry the shaping tool in a position where the tool head extends past a side wall of the slide plate, or the slide plate may define a recess with an open side for passing the tool head.

Figure 5:
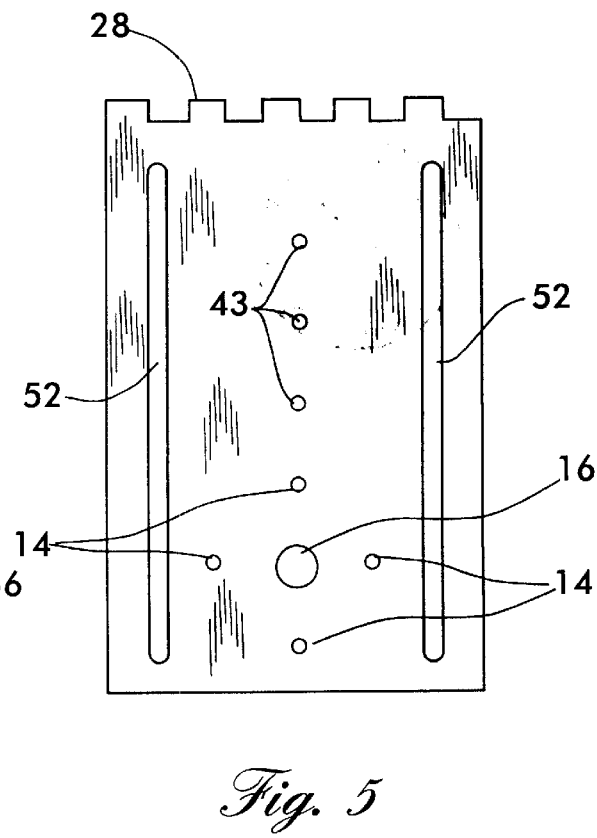
FIG. 5 is a top plan view of a slide plate, showing mounting points for the shaping tool and for a channel follower, and showing adjustment slots for locking the slide plate and base plate in a fixed position with respect to each other.

As best shown in FIGS. 1 and 5, the slide plate is provided with mounting means such as mounting holes 14 for receiving mounting screws, bolts, brackets, or clamps that attach the shaping tool to the slide plate at a predetermined mounting location. The shaping tool 18 can be any type of power driven tool that cuts, routs, grinds, mills or otherwise removes stock from a workpiece, especially from a wooden workpiece. Substantially every shaping tool performs work by applying a spinning tool head 20 with chisel members on its circumferential edge. Such a tool head often is termed a bit or a blade. The mount for the shaping tool places the bit at a predetermined position such that the bit can extend through or around the plate when in operation.

Hand held shaping tools 18 typically are equipped with a support plate 22, FIG. 2, adapted to rest the tool motor upon a workpiece while the tool head is performing work. The support plate establishes a distance between the workpiece and the tool motor 24, so that the tool head can be adjusted for a desired degree of engagement with the workpiece. A router is one example of a suitable shaping tool. The router can axially extend a bit over a predetermined range of positions beyond its support plate.

A typical router is provided with mounting points that enable screws to fasten the router to the slide plate 12. The slide plate differs from the tool's own support plate in that the slide plate can be a second or supplemental plate to which the support plate is attached. However, if desired, the router's support could be removed and the remaining portion of the router could be directly attached to the slide plate. The slide plate further differs from the tool's support plate in that it either carries a channel follower 26 on its bottom surface or a hinge connection 28 at an edge, as will be described in greater detail, below.

A power saw is another example of a suitable shaping tool 18. Circular saws and jig saws typically are provided with a support plate 22 through which a tool head in the configuration of a saw blade extends. Such support plates can be attached to a slide plate 12 by various types of clamps or fastening brackets. Alternatively, a saw support plate can be modified by addition of mounting holes that receive screws or bolts for connecting the support plate to a slide plate. While not all shaping tools conform to one mounting point pattern, the slide plate can be adapted to fit a given pattern by drilling appropriate mounting holes 14 into it.

Movement of the slide plate with respect to the workpiece is guided by a means permitting the slide plate to move only along a single linear elongated axis of movement lying parallel to the plane of the slide plate. This limited movement along a single axis guides the tool head as it performs work on a workpiece located below the bottom face of the slide plate. The tool head is guided for movement parallel to the axis to cut a straight groove into the workpiece. Such a groove may be, for example, a mortise, dado, rabbet, or kerf.

One suitable cooperating means for permitting the slide plate to move only along a single linear elongated axis is a planar second plate 30, which will be referred to as a base plate, disposed substantially parallel to the plane of the slide plate. The second plate supports the first plate for relative sliding motion between the two plates. The slide plate is adapted to carry the shaping tool 18 on the side opposite the base plate. Consequently, the tool head extends through the slide plate to the second side of the slide plate, which faces the base plate.

In order to accommodate the tool head in its position on the second side of the slide plate, the base plate can be sized and positioned such that the tool head aperture is outside the edge of the base plate, as shown in FIG. 2. Alternatively, the base plate can be configured to receive the tool head into a recess or channel 32 formed in a first or top side of the base plate, facing the slide plate.

Figure 7:
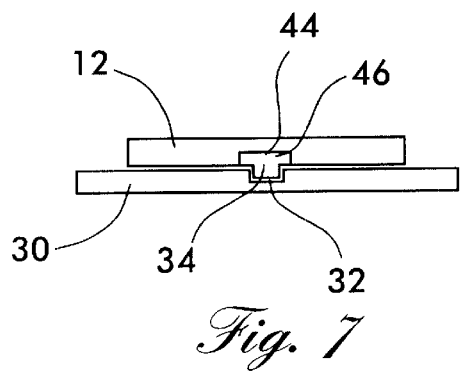
FIG. 7 is a front elevational view of the linear guide, showing the engagement of the channel follower in the slide plate and base plate.

In a first embodiment best shown in FIG. 7, the base plate and slide plate are engaged by a guiding means allowing the two plates to move with respect to each other along a predefined elongated longitudinal path, following the axis of movement. The preferred guiding means is a follower and channel system cooperating between the base plate and slide plate. When the base plate and slide plate are positioned face-to-face, the linear channel 32 formed in one of the plates receives and guides the follower 26 carried by the other. The two opposed faces provide lateral stability between the plates while allowing the plates to slide with respect to each other. The axis of movement may be regarded as a centerline axis of the channel or follower, or an axis parallel thereto.

The preferred linear channel 32 is a longitudinally elongated, generally U-shaped channel that is formed in the first or top surface of the base plate 30. The channel lies along a linear axis. The open side of the channel faces the second side or bottom of the slide plate 12. A mating, longitudinally elongated follower or rib 34 is carried by the second side or bottom of the slide plate, extending toward the base plate, and is sized to closely fit between the side walls of the channel. Therefore, the follower fits into the channel and moves parallel to the channel substantially along the linear axis of the channel. Movement between the channel and follower are along this axis as long as the two plates are in sliding relationship.

Figure 3:
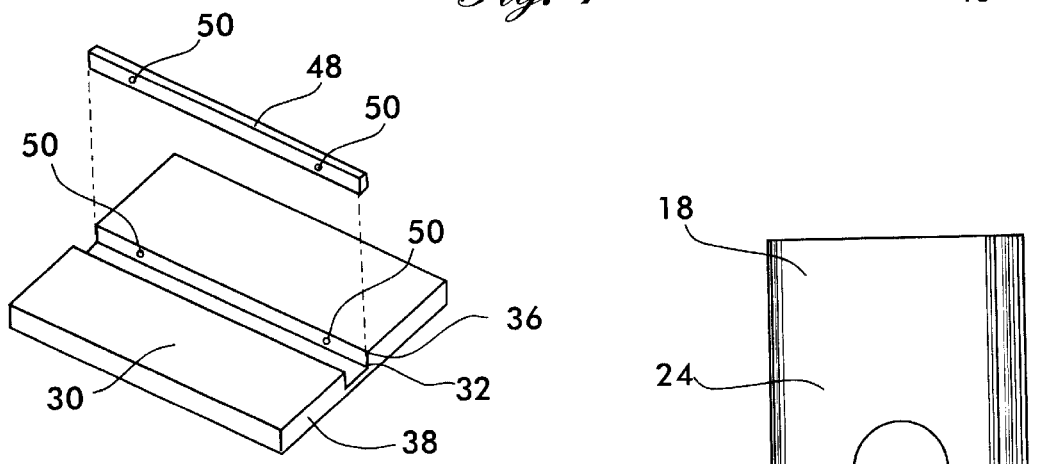
FIG. 3 is an isometric assembly view of a base plate, showing a guide channel and showing the attachment of a side filler strip.

As best shown in FIGS. 2 and 3, at least one end 36 of the guide channel 32 is open, such that the follower can exit the channel by sliding axially through the open end. The open end 36 may be referred to as the front end of the channel, for convenience of reference. Correspondingly, the edge 38 of the base plate at the front end of the channel may be referred to as the front edge, while the opposite edge may be referred to as the rear edge. The slide plate has a front edge and a rear edge in corresponding relative orientation. The follower is an elongated rib that has correspondingly oriented front and rear ends. Correspondingly, the axis of movement of the guide is a front-to-rear axis.

The mounting location for the power driven shaping tool on the slide plate is near the front edge of the plate. This mounting location and, more specifically, the tool aperture are positioned so that the tool head can be placed through the tool aperture and in line with the channel follower. The front end of the follower preferably terminates slightly to the rear of the tool aperture and intended tool head position. This positioning allows sufficient room for a tool head to operate on the workpiece without interfering with the follower. Therefore, the tool aperture can be described as forwardly offset from the forward end of the channel follower.

In one mode of operation, the slide plate is placed in forward motion with respect to the base plate, and the tool head leads the channel follower. The follower 26 is mounted to the slide plate between the tool aperture and rear edge of the slide plate and is offset to the rear of the tool aperture. Thus, the slide plate can be moved forward to a point where the tool head exits the front end of the channel, while the channel follower remains at least partially within the channel.

A workpiece such as a wooden board is positioned in front of the base plate, such as juxtaposed to the front edge 38 of the base plate. The base plate and workpiece can be fastened to an underlying work table 40, shown in phantom in FIG. 1. The work table might be any convenient supporting surface, such as a work bench. A suitable fastener for holding a workpiece to the work table can be a common shop clamp.

As the slide plate is moved forward, a power driven tool head will exit the channel slot 32 and will enter the workpiece, where the tool head will cut a groove such as a mortise, dado, rabbet or kerf. Continued forward movement of the slide plate will extend the cut groove being formed in the workpiece. This groove will be straight due to the continued guidance provided by engagement between the follower 34 and the channel 32.

The best selection and adjustment of the tool head provides a tool head 20 of equal width to the channel 32 and adjusted to cut a groove of equal or greater depth than the height of the follower 34. With this selection and adjustment of a tool head 20, the slide plate can be moved forward to the point that the follower 34 begins to exit the front 36 of the channel and enter the cut groove. The dimensional sameness between the cut groove and the channel provides continued guidance to the tool head over a linear path. It would be possible to move the slide plate 12 forward to bring the entire follower 34 out of the channel 32 and into the cut groove, in which case the workpiece substitutes for the base plate in supporting and further guiding the slide plate. Long cut grooves can be formed in this way, without a limitation that the length of the follower 34 must be sufficient to continue engagement in the channel 32.

According to the nature of the shaping tool, the tool head may be, for example, a router bit or a circular saw blade. A standard function of substantially any router is an ability to extend its bit. Thus, a router carried on the top surface of the slide plate can be adjusted to extend a bit below the bottom surface of the slide plate. The tool aperture 16 is located to allow the router bit to be positioned at an intersection with the linear axis of the follower and channel system. Thus, a router bit extending through the tool aperture will perform its routing function along the axial line of movement of the follower.

Similarly, substantially any circular saw has the ability to extend its blade by a variable distance below the support plate of the saw. A tool aperture 16 for receiving a circular saw blade through the slide plate is an elongated slot parallel with the axis of the follower, such that the blade can be extended through the slot and into the axis, parallel to it. Thus, the follower tracks the line of movement of the blade.

Linear grooves such as a mortise, dado, and rabbet, typically are of a predetermined width such as ¾ inch (19 mm). The channel follower and the tool head or bit preferably are of the same width. Correspondingly, the channel in the base plate is approximately equal to the width of the follower and, hence, of a preselected router bit.

Figure 6:
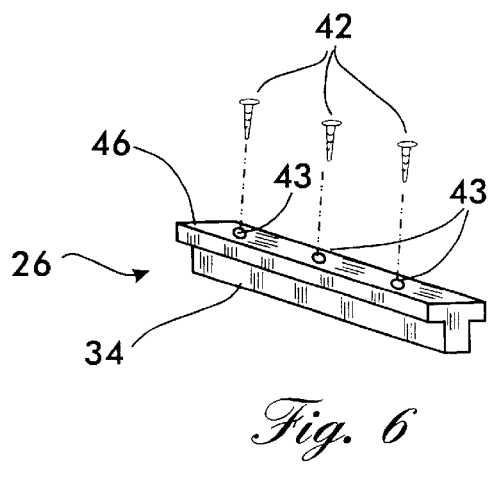
FIG. 6 is an isometric view of an interchangeable channel follower that is carried in a mounting slot on the bottom face of the slide plate and slidably receivable in the guide channel of the base plate.

A modification of the guide permits the slide plate to follow a mortise, dado, or other cut groove of substantially any common width. For this purpose, the channel follower attached to the bottom of the slide plate may be interchanged with a different channel follower of different preselected width. With reference to FIG. 6, the slide plate may connect to a follower by removable fasteners 42 such as screws. Thus, a follower of any suitable width can be screwed to the bottom surface of the slide plate. The width of a bit in a router and the width of the follower can be coordinated to be substantially the same.

The follower may be received into a preformed mounting slot 44 in the bottom face of the slide plate in order to ensure accuracy of alignment. Variously sized interchangeable followers each may have a mounting flange 46 of a single size and shape that coordinates and closely fits into the mounting slot 44. The shape of the slot can be as desired, such as a rectangular shape or a dovetail shape. Fasteners such as screws 42 can secure the mounting flange to the slot in the slide plate by passing through preformed screw holes 43 in the slide plate 12 and mounting flange 46. The mounting flange may carry a protruding channel follower rib 34 of any desired width. Thus, the typical ¾ inch (19 mm) rib can be replaced with a ½ inch (13 mm) rib so that the slide plate can follow the mortise or dado that is cut by a ½ inch (13 mm) bit. The height of a follower rib also may be varied by substituting another follower of the desired rib height. Thus, both the width and depth of a cut groove can be coordinated with a follower size, within the available space in the channel of a base plate.

Figure 4:
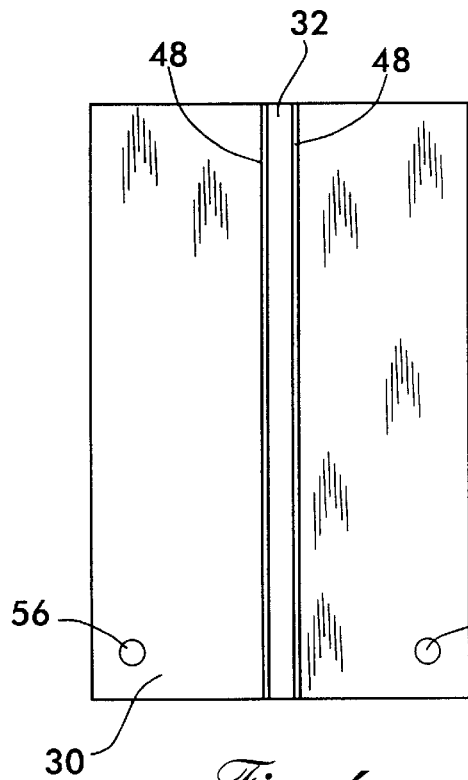
FIG. 4 is a top plan view of a base plate, showing a linear guide channel for reception of a channel follower.

As best shown in FIGS. 3 and 4, the base plate 30 may be modified to match the substitution of ribs in the slide plate. For example, when a ¾ inch (19 mm) follower rib is replaced by a ½ inch (13 mm) rib on the slide plate, a single filler strip 48 having a width of ¼ inch (6.5 mm) can be mounted to a side wall of the channel 32 in the base plate 30 to conform the width of the channel 32 to the width of the new follower. Alternatively, to achieve the same result, a pair of filler strips 48, each one-half the total adjustment, i.e., each ⅛ inch wide, can be mounted with one filler strip on each lateral side of the channel, as shown in FIG. 4. A filler strip 48 can be attached to a side of the channel in a temporary way, such as by screws, pins, or clips for easy installation and removal. The filler strip and base plate may share any suitable structure such as pin holes 50 to enable such attachment and removal.

Generally it should not be necessary to modify the depth of the channel, as the channel depth can exceed the height of the follower without loss of guiding accuracy. Thus, the channel 32 in a base plate 30 can be originally formed to the maximum practical depth and will accommodate any follower of less height. Similarly, a tool head 20 such as a router bit can be adjusted to cut a groove deeper than the height of the follower without preventing the follower from entering the cut groove in the workpiece. The practical limit on the depth adjustment of a cut is the depth of the channel 32, in the situation where the router bit must begin its operation while still within the channel 32.

In a second mode of operation illustrated in FIGS. 1, 2, 4 and 5, the guide 10 provides a means fixing the position of the slide plate with respect to the base plate. Such a fixing means permits the selective securing or locking of the first plate in variably selected positions along the axis of movement with respect to the second plate. At least one and preferably two linearly elongated adjustment slots 52 are formed through the thickness of the slide plate 12. The adjustment slots may be located near the opposite lateral edges of the slide plate, extending parallel to the follower and axis of movement. A clamping bolt 54 with a knurled knob at its head extends through each adjustment slot and is received in a receiver in the base plate, such as in a threaded socket 56 or in an embedded nut. When the clamping bolts 54 are loose with respect to the slide plate, the elongated adjustment slots are free to slide with respect to the clamping bolts over the length of the adjustment slots. The clamping bolts can be tightened to secure the slide plate in a fixed position with respect to the base plate. Thus, the clamping bolts can be used to secure a router bit at a fixed position with respect to the base plate, such as at a predetermined position in front of the base plate as suggested by FIG. 2.

Typically, such a fixed position will be beyond the front edge of the base plate so that the bit can perform work on a workpiece that is moved transversely to the axis of the follower and channel system. A tool head such as a router bit is omni-directional. The workpiece can be moved in any direction within the plane of the base plate with respect to a router bit. A fixed position of the slide plate, with the router bit offset forwardly of the front edge of the base plate, is desirable for cutting various types of grooves, including grooves deeper than the available depth of the channel in the base plate.

In this second mode, the base plate is supported upon a work table 40 and may be attached to the work table by a fastening means such as clamps or screws. Typically, the base plate is the same or greater thickness than the expected workpiece, such as ¾ inch (19 mm). Thus, the slide plate is spaced from the work table by the thickness of the base plate. Such a spacing defines the available thickness for receiving a workpiece between the slide plate the work table.

The guide is set-up in the second mode by moving the slide plate forward until the router bit extends beyond the front edge of the base plate with a predetermined extension or depth adjustment The slide plate then is secured to the base plate by tightening the clamp bolts. A workpiece now can be guided along the front edge of the base plate, below the slide plate, while the router forms a groove of the preselected depth in the workpiece. The length of the groove is not limited, as any length of workpiece can be slid along the front edge of the base plate. Typically this mode is used to form a rabbet groove, with the router bit cutting only into the edge of the workpiece.

In a second embodiment, the slide plate may be guided with respect to the base plate by an alternate or optional guiding means. FIGS. 1 and 2 show the slide plate attached at its rear edge to a series of hinged extension plates 60. At the rear end of the base plate, the rearwardmost extension plate is jointed to an anchor plate 62, which may be fastened to the base plate by suitable fasteners 64 such as screws.

The anchor plate, extension plates, and slide plate are connected in series by piano style hinges 66. Each hinge is defined by a continuous series of hinge housing segments 28 united by a hinge pin 68. This type of hinge resists wobble and can guide the slide plate along a linear path. As suggested by FIG. 1, the hinge pin 68 can be removed at the rear edge of the slide plate to free the slide plate for independent movement.

An extension plate system can be enlarged by adding more extension plates 60 to the series. Each extension plate is identical, and the anchor plate 62 may be a final extension plate. As shown in FIG. 5, the slide plate can be configured with hinge housing segments 28 at its rear edge for optional attachment to a series of extension plates. For accuracy in guidance, it is preferred to use a larger number of short extension plates, rather than a smaller number of longer extension plates. Thus four shorter extension plates are preferred over two longer extension plates.

The extension plates permit the guide to operate without the follower and channel system. Without a follower on the slide plate, the slide plate can be placed on top of a workpiece even before a straight groove such as a mortise or dado is cut into the workpiece. The slide plate can rest flat against the workpiece, and the router bit can be positioned on the forward edge of the workpiece to cut a mortise or dado while moving the slide plate rearwardly.

The extension plates also are useful to improve the accuracy of linear guidance when the channel and follower system is in use. The accordion style extension plates can provide a second and supplemental means for guiding the slide plate along a straight path. The extension plates allow the interchangeable and automatic selection of which guiding means will be in effect For example, when a narrower bit is temporarily substituted into a router, the extension plates can make it unnecessary to add filler strip 48 to the sides of the channel. It may remain necessary to coordinate the width of the follower rib 34 with the width of the router bit, so that the follower can enter the cut groove in the workpiece. However, while the extension plates guide the slide plate, the channel optionally can be allowed to be wider than the follower rib.

The base plate and slide plate may be constructed for durability and lubricity. The slide plate is suited both to carry the router and to slide over both the base plate and the workpiece. Thus, for many woodworking applications, the slide plate can be constructed of a synthetic plastic material such as a hard nylon, which slides over both a hard nylon base plate and a wooden workpiece with reasonable lubricity. Other suitable materials of construction include wood, metal, still other plastics, and elastomers. A suitable thickness for a hard nylon slide plate is about one-half inch (13 mm), although this dimension can be varied considerably. The base plate may be constructed of the same or similar material as the slide plate. However, the thickness of the base plate can be chosen to provide space to receive the workpiece, as mentioned above. Thus, the base plate might have a thickness of one-half to three-fourths inch merely to accommodate the thickness of a typical workpiece. Additional spacers readily can be added under the base plate to accommodate still thicker workpieces.

The forgoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. A guide for directing a power driven shaping tool adapted to carry a tool head in a predetermined position, for movement along a linear axis of movement, comprising:
   a first plate having first and second opposite faces positioned parallel to the linear axis of movement;
   means for, in use, connecting a shaping tool to the first side of the first plate in a predetermined position from which a tool head carried by the shaping tool can be extended to a predetermined tool head position beyond the second side of the first plate;
   means for guiding movement of the first plate along the linear axis of movement, selected from the group consisting of:
   (1) a longitudinally elongated channel follower positioned parallel to the linear axis of movement, aligned with the predetermined tool head position, and extending from the second face of the first plate;
   (2) a plurality of juxtaposed guiding members joined in a linearly extendable series by pivot means operable on parallel axes, interconnecting said guiding members, wherein said guiding members are moveable along the axis of movement between a folded position and an extended position, and wherein a guiding member on a leading end of the linear series is pivotally joined to said first plate, and a guiding member located on a trailing end of the linear series carries a means for anchoring the trailing member, in use, to an external surface; and
   (3) the combination thereof;
   whereby the means for guiding movement of the first plate directs the first plate in movement along the linear axis of movement.

2. The guide of claim 1, further comprising:
   a second plate having first and second opposite faces positioned parallel to the linear axis of movement, with said first face of the second plate facing said second face of the first plate, and with the second plate defining a longitudinally elongated channel in the first face thereof, positioned parallel to the linear axis of movement, and sized to receive said channel follower.

3. The guide of claim 2, wherein said second plate defines at least one open end of said elongated channel.

4. The guide of claim 2, wherein said elongated channel is of a predetermined channel width.

5. The guide of claim 4, further comprising at least one elongated filler strip sized to fit within said channel along a side thereof for partially occupying said predetermined channel width to produce a resulting modified channel of relatively narrower channel width.

6. The guide of claim 4, wherein said channel follower comprises: elongated first rib of a preselected first width similar to said predetermined channel width; and
   selectively removable and attachable fastening means for enabling the selective attachment and removal of the first rib with respect to said first plate.

7. The guide of claim 6, further comprising:
   an elongated second rib of a preselected second width similar to said modified channel width; and
   wherein said selectively removable and attachable fastening means further enables the selective attachment and removal of the second rib with respect to said first plate for the selective attachment of either rib to said first plate.

8. The guide of claim 2, further comprising:
   a securing means for selectively locking said first plate in variably selected positions along the axis of movement with respect to said second plate.

9. The guide of claim 8, wherein said securing means comprises:
   a clamping bolt and a bolt receiver; and
   wherein said first plate defines at least one elongated positioning slot extending between the first and second faces thereof, laterally offset from said predetermined tool head position, parallel to the linear axis of movement, and receiving said clamping bolt therethrough; and
   said second plate carries the bolt receiver in a position opposite said positioning slot for receiving the bolt in a selectively tightenable and loosenable relationship.

10. The guide of claim 1, wherein said channel follower comprises:
    an elongated first rib of a preselected first width; and
    selectively removable and attachable fastening means for enabling the selective attachment and removal of the first rib with respect to said first plate.

11. The guide of claim 10, further comprising:
    an elongated second rib of a preselected second width different from said first width of said first rib, enabling the selective attachment of either rib to said first plate.

12. The guide of claim 1, wherein:
    each of said juxtaposed guiding members has a front edge and a rear edge and comprises a series of spaced apart hinge housing segments along said front edge and rear edge thereof, arranged such that the housing segments on a front edge of a member fit between the segments on a rear edge of another member for defining a substantially continuous hinge housing at mating edges.

13. The guide of claim 12, wherein said juxtaposed guiding members further comprise a hinge pin engageable in each of said substantially continuous hinge housings.

14. A method of guiding a tool head of a power driven shaping tool to cut a linear groove in a workpiece, comprising:
    preselecting a tool head of a size suited to cut a groove of predetermined width in a workpiece and preselecting a width for a longitudinally elongated follower rib similar to said predetermined groove width;
    providing a shaping tool carried on a first side of a first plate with the preselected tool head extending beyond a second and opposite side of the first plate at a predetermined position;
    providing a follower rib of said preselected width on the second side of said first plate in a position where the rib is longitudinally aligned with the predetermined position of the tool head;
    providing a second plate opposed to the second side of the first plate in slidable relationship, having in the opposed face thereof a longitudinally elongated guide channel of a width similar to said predetermined groove width, and engaging the follower rib longitudinally in the guide channel;
    locating a workpiece at an end of the second plate and in line with the guide channel;
    cutting a groove in the workpiece by sliding the first plate over the second plate in line with a longitudinal axis of the rib and guide channel such that the tool head engages the workpiece while guided in alignment with said longitudinal axis.

15. A method of forming a straight groove in a workpiece by use of a power driven groove forming tool operating a tool head of predefined width for forming a groove of substantially the predefined width of the tool head, comprising:
    providing a supporting plate with first and second faces, carrying the groove forming tool on a first face of the plate while contacting the workpiece against the second face of the plate, and having the tool head extending from the second face of the supporting plate;
    providing a groove follower rib extending from the second face of the supporting plate, the rib having a width substantially no wider than the tool head for enabling the follower rib to enter a groove that the tool head cuts into the workpiece;
    cutting a straight groove into a workpiece by advancing the supporting plate with respect to the workpiece with the tool head axially leading the follower rib, such that the follower rib enters the cut groove in a position axially trailing the tool head.

* * * * *